US000001136H

United States Statutory Invention Registration [19]

[11] Reg. Number: H1136

Janikowski

[43] Published: Feb. 2, 1993

[54] ELECTROLYTIC DEPOSITION AND RECOVERY OF SILVER

[75] Inventor: Stuart K. Janikowski, Idaho Falls, Id.

[73] Assignee: The United States of America as represented by the Secretary of the Air Force, Washington, D.C.

[21] Appl. No.: 800,291

[22] Filed: Nov. 29, 1991

[51] Int. Cl.[5] ..... C25D 3/46

[52] U.S. Cl. ..... 205/263

[58] Field of Search ..... 205/263

[56] References Cited

U.S. PATENT DOCUMENTS

| | | | |
|---|---|---|---|
| 3,238,112 | 3/1966 | Haslam | 204/45 |
| 3,362,895 | 1/1968 | Foulke | 204/43 |
| 3,915,718 | 10/1975 | Ludwig et al. | 106/1 |
| 4,021,319 | 5/1977 | Moeglich | 204/96 |
| 4,111,766 | 9/1978 | Idota et al. | 204/109 |
| 4,126,524 | 11/1978 | Hradil et al. | 205/263 |
| 4,246,077 | 1/1981 | Hradil et al. | 204/43 R |
| 4,377,449 | 3/1983 | Kohl | 204/46 R |
| 4,478,691 | 10/1984 | Abys | 205/263 |
| 4,652,465 | 3/1987 | Koto et al. | 427/216 |

OTHER PUBLICATIONS

"Electroplating Baths for Silver", Natarajan et al., Metal Finishing (Feb. 1991).

"Stripping of Nickel Deposits with Ethylene Diamine", Natarajan et al., Metal Finishing (Dec. 1984).

Chemical Abstract: 81:85272k, Oct. 7, 1974.

Chemical Abstract 95: 158643h, Nov. 2, 1981.

*Primary Examiner*—Donald P. Walsh

*Assistant Examiner*—Ngo Clan T. Mai

*Attorney, Agent, or Firm*—Donald J. Singer; Bobby D. Scearce

[57] ABSTRACT

A method for electroplating sliver is described which comprises a plating and/or stripping solution of an alkali hydroxide and ethylenediamine having a basic pH in the range of about 7.5 to 13, and having an ethylenediamine concentration of about 5 to 33% by volume, the electroplating (at the cathode) and/or stripping (at the anode) being performed with an applied DC potential across the electrodes of about 2 to 6 volts.

13 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

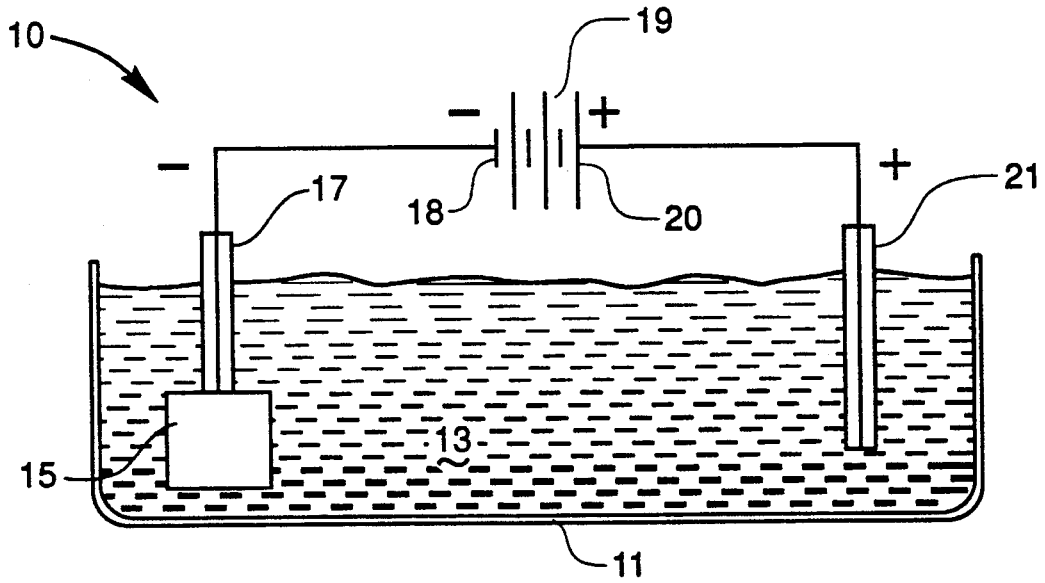
10
19
−
+
−
+
17
18
20
21
13
15
11

ELECTROLYTIC DEPOSITION AND RECOVERY OF SILVER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to methods and systems for electrodeposition of silver, and more particularly to an improved, cyanide-free method for silver deposition or recovery.

In a process for electroplating a metal, a part to be plated is usually connected to the negative terminal of a direct current (DC) power source. The positive terminal is connected either to an insoluble anode or to an anode constructed of the metal part to be plated. The part to be plated and the anode are immersed in an electroplating solution containing ions of the plating metal. Plating metal is dissolved at the anode (when soluble anodes are used) and deposited (plated) on the part to be plated (at the cathode). Conventional electroplating solutions for silver are generally of the aqueous type comprising cyanide in basic solution, and may contain additives (addition agents) to enhance the deposition process and/or the appearance or performance characteristics of the coating.

The invention provides an improved, cyanide-free method for electrodepositing silver metal onto current conducting substrates in either a silver plating process or a silver recovery process from silver bearing scrap. A substrate to be plated is connected to the negative terminal of a DC power supply, and the positive terminal is connected to the solution containment vessel, to an insoluble anode, or to a silver anode in electrical contact with an aqueous electrolyte solution of ethylenediamine and an alkali hydroxide of selected basic solution. Addition agents, corrosion inhibitors and other electrolytes common to conventional cyanide silver plating solutions may be added. In practicing the invention, silver is dissolved at the anode without damaging steels similarly exposed to conventional (basic cyanide) electroplating solutions. The invention may be particularly useful in continuous silver plating processes. Silver deposition may be achieved in the presence of contaminants in solution typically found and/or are acceptable in conventional silver plating solutions, e.g. sodium, iron, nickel and copper. Certain contaminant metals, to include but not limited to, copper, gold, nickel, iron, tin and zinc may be dissolved at the anode. Tolerances to these metals and others (e.g., sodium, potassium, calcium, etc.) are similar to those observed in cyanide Plating baths. Significantly, nickel does not plate out substantially in the practice of the invention. Applied voltages required to achieve deposition are similar to those required in cyanide baths, e.g., higher silver loadings and higher electrolyte concentrations require less applied voltage to maintain acceptable current densities. When used in a silver recovery process, the purity of the recovered silver may be enhanced by controlling solution purity and using low operating current densities. Spent electroplating solutions may be treated for extraneous metals and disposed of as biodegradable.

It is therefore a principal object of the invention to provide an improved method for electroplating silver.

It is a further object of the invention to provide an improved cyanide-free plating solution for electroplating silver.

It is yet another object of the invention to provide method and electroplating solution for the recovery of silver from silver bearing scrap.

These and other objects of the invention will become apparent as a detailed description of representative embodiments proceeds.

SUMMARY OF THE INVENTION

In accordance with the foregoing principles and objects of the invention, a method for electroplating silver is described which comprises a plating and/or stripping solution of an alkali hydroxide and ethylenediamine having a basic pH in the range of about 7.5 to 13, and having an ethylenediamine concentration of about 5 to 35% by volume, the electroplating (at the cathode) and/or stripping (at the anode) being performed with an applied potential across the electrodes of about 2 to 6 volts.

DESCRIPTION OF THE DRAWINGS

The invention will be more clearly understood from the following detailed description of representative embodiments thereof read in conjunction with the accompanying drawing which is a schematic of the essential components of a system for practicing the method of the invention.

DETAILED DESCRIPTION

Referring now to the drawing, shown therein is a schematic of the essential components of a system 10 incorporating the invention and useful in the practice of the method thereof. System 10 includes a pair of electrodes immersed in an electrolytic bath 11 containing electrolyte solution 13 of novel composition. Part 15 to be silver plated is connected to cathode 17 and negative terminal 18 of DC power source 19. Positive terminal 20 of power source 19 is connected to conducting anode 21 immersed in solution 13 in spaced relationship to cathode 17 and part 15. Anode 21 may preferably comprise platinum, although other conductors such as silver, titanium, tantalum or stainless steel may be used. Anode 21 may be in the form of silver bearing scrap for recovery of silver by plating onto cathode 17, or may be in the form of a source of silver for plating a substrate of any desired shape disposed at or connected to cathode 17.

In accordance with a principal feature of the invention, solution 13 may consist essentially of an aqueous solution of ethylenediamine made basic with an alkali hydroxide, preferably potassium hydroxide (KOH), to a pH in the range of about 7.5 to 13, and preferably 9 to 13. Other alkalis contemplated as usable within the scope of the teachings hereof include sodium hydroxide (NaOH), potassium carbonate ($K_2CO_3$), or sodium carbonate ($Na_2CO_3$), or a mixture of any of these with potassium bicarbonate ($KHCO_3$) or sodium bicarbonate ($NaHCO_3$). Solutions 13 used to plate silver in demonstration of the invention were 0.1M NaOH and ethylenediamine in a ratio of 4:1. Other concentration ratios of NaOH and ethlyenediamine were found to promote silver plating according to the invention, namely, trace to greater than 0.5M NaOH in solutions containing trace, and preferably about 5% to greater than 35% by volume ethylenediamine. Similar results were obtained using KOH with ethylenediamine in solution 13.

Other small heteroatomic organics can be used in place of or in conjunction with ethylenediamine and similarly promote anodic silver stripping and cathodic deposition under the conditions described herein. These include but are not limited to amines (ethylenetriamine, ethanolamine, triethanolamine, etc.), sulfur containing species (thiosulfate, thiocyanate), and nitroaromatic compounds (m- or p-nitrobenzene sulfonate, nitrophenols, nitrobenzoates, etc.).

Further, addition agents, corrosion inhibitors and electrolytes may be added to the invention to enhance plating characteristics, aesthetics, adhesion, crystal size, corrosion, electrode polarization, finish, and bath longevity. Commercial and generic brighteners (starch, sugar, ethanol, etc.), corrosion inhibitors (nitroaromatics, phosphates, silicates, etc.) and electrolytes (sodium, potassium or silver nitrate, carbonates, etc.) are examples of added components that may be used.

Successful plating of silver from anode 21 to cathode 17 was achieved at a DC potential applied to anode 21 of at least +0.1 volt and preferably in the range of +0.2 to about −1.5 volts DC versus a platinum reference electrode. Alternatively, plating was achieved by application of 2 to 6 volts when using power supplies currently used for conventional plating. A DC potential in the stated range resulted in dissolution of silver at anode 21 without damaging similarly exposed steel comprising the containment vessel of bath 11 or the substrate to be plated.

In an alternative embodiment of the invention, an electrically conductive substrate to be plated is connected to negative terminal 18 of DC power source 19, and positive terminal 20 is connected to the containment vessel of bath 11, to an insoluble anode or to a silver anode, in electrical contact with solution 13. An aqueous solution of NaOH in ethylenediamine in the concentration ated silver nitrate solution and 2 to 6 volts applied by DC power source 19 resulted in successful plating of silver from solution. Alternatively, silver deposition from the solution occurred in the range +0.2 to −1.5 volts versus a platinum reference electrode immersed in the solution.

The invention therefore provides an improved method for electrodeposition and recovery of silver. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims

I claim:

1. A method for electroplating silver, comprising:

(a) providing an electrolyte solution comprising an alkali hydroxide and an amine;

(b) providing a pair of electrodes immersed in said solution;

(c) attaching a source of silver to the anode of said electrodes; and (d) applying a DC potential across said electrodes.

2. The method of claim 1 wherein said amine is selected from the group consisting of ethylenediamine, ethanolamine, triethanolamine and ethylenetriamine.

3. The method of claim 2 wherein said amine in said solution is in a concentration in the range of about 5% to 35% by volume.

4. The method of claim 3 wherein said electrolyte solution has a pH in the range of 7.5 to 13.

5. The method of claim 1 wherein said alkali hydroxide is selected from the group consisting of sodium hydroxide and potassium hydroxide.

6. The method of claim 5 wherein said electrolyte solution further comprises a material selected from the group consisting of sodium carbonate, potassium carbonate, sodium bicarbonate, potassium bicarbonate, sodium nitrate, potassium nitrate, silver nitrate, sugar, starch and ethanol.

7. The method of claim 1 wherein said DC potential is in the range of about 2 to 6 volts.

8. An electrolyte solution for use in electroplating silver comprising an alkali hydroxide and an amine.

9. The electrolyte solution of claim 8 wherein said amine is selected from the group consisting of ethylenediamine, ethanolamine, triethanolamine and ethylenetriamine.

10. The electrolyte solution of claim 9 wherein said amine in said solution is in a concentration in the range of about 5% to 35% by volume.

11. The electrolyte solution of claim 10 wherein said electrolyte solution has a pH in the range of 7.5 to 13.

12. The electrolyte solution of claim 8 wherein said alkali hydroxide is selected from the group consisting of sodium hydroxide and potassium hydroxide.

13. The electrolyte solution of claim 12 wherein said electrolyte solution further comprises a material selected from the group consisting of sodium carbonate, potassium carbonate, sodium bicarbonate, potassium bicarbonate, sodium nitrate, potassium nitrate, silver nitrate, sugar, starch and ethanol.

* * * * *